United States Patent [19]
Tiby

[11] 3,931,900
[45] Jan. 13, 1976

[54] PEELER AND GRATER APPARATUS
[75] Inventor: Gerard A. Tiby, Ivry-sur-Seine, France
[73] Assignee: Hobart Corporation, Troy, Ohio
[22] Filed: Dec. 18, 1972
[21] Appl. No.: 316,280

[30] Foreign Application Priority Data
Oct. 23, 1972 France .............................. 72.37486

[52] U.S. Cl. ............... 241/296; 241/92; 241/273.2; 241/282.1
[51] Int. Cl.² ....................... A47J 43/25; B02C 18/18
[58] Field of Search ............ 241/91, 92, 296, 292.1, 241/279, 282.1, 273.1–273.3, 278; 99/541, 584, 593, 594

[56] References Cited
UNITED STATES PATENTS
| | | | |
|---|---|---|---|
| 1,017,586 | 2/1912 | Petchuck | 241/278 |
| 1,469,369 | 10/1923 | Trust et al. | 241/273.2 X |
| 2,078,507 | 4/1937 | Pace | 241/92 X |
| 3,266,540 | 8/1966 | Bradham | 99/593 |

Primary Examiner—Roy Lake
Assistant Examiner—E. F. Desmond
Attorney, Agent, or Firm—Biebel, French & Bugg

[57] ABSTRACT

The knives on the surface of a peeler and grater disc for a vegetable peeling machine are formed from portions of the disc and are integral therewith. The knives are arranged in generally spiral rows from the center of the disc. Upturned reinforcing lips formed from and integral with the disc are located adjacent slots in front of each individual knife. The lips and knives cooperate to define the knife cutting depths. A pair of radially extending ribs on the disc cooperate with spiral ribs along the walls of the peeling chamber to promote circulation and rotation of all the vegetables for uniform exposure of all sides of all the vegetables to the disc.

4 Claims, 8 Drawing Figures

U.S. Patent    Jan. 13, 1976    3,931,900
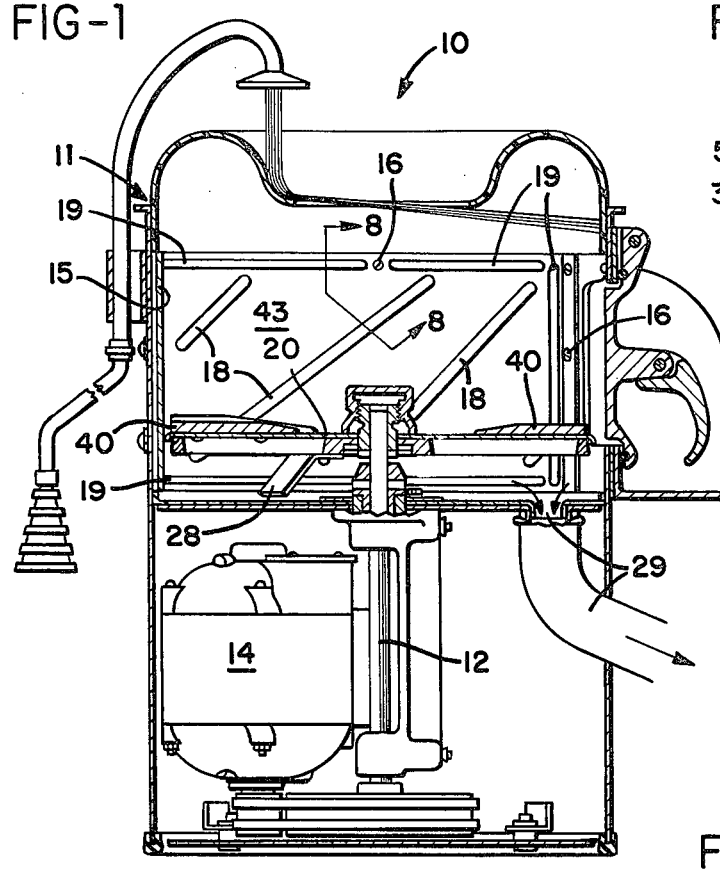
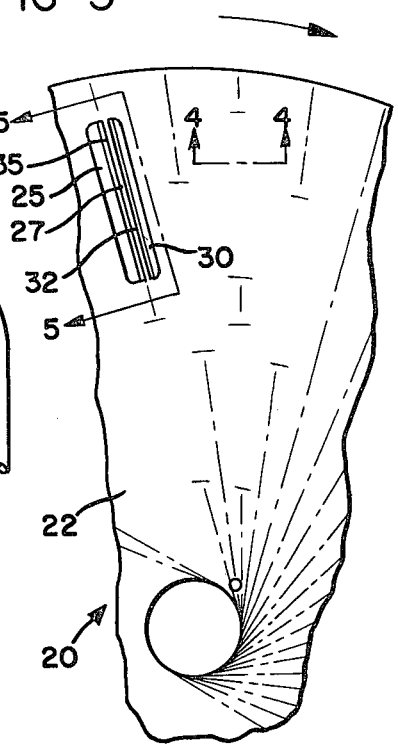
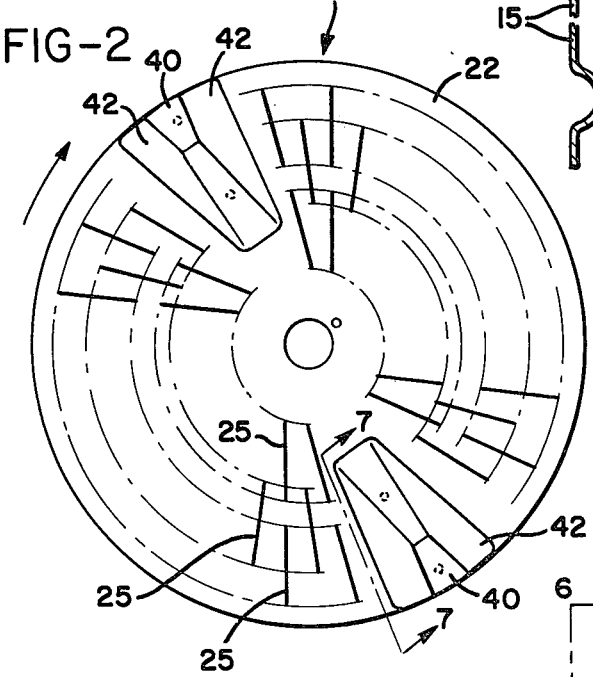
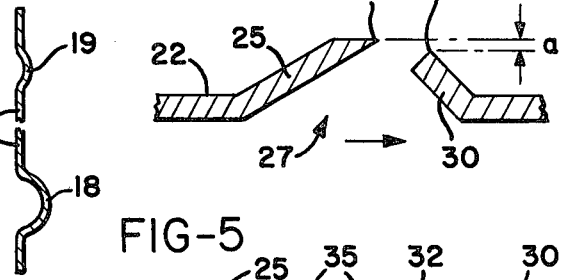
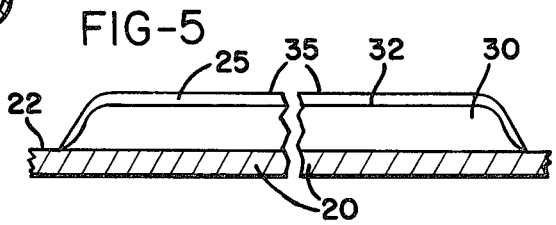
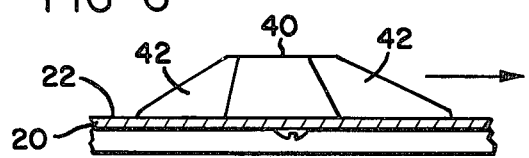
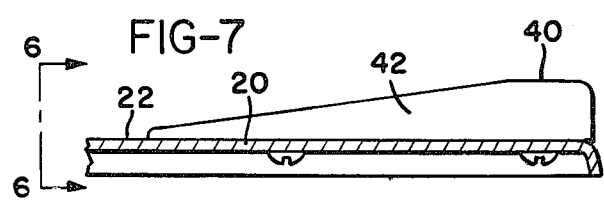

PEELER AND GRATER APPARATUS

BACKGROUND OF THE INVENTION

This invention relates to vegetable peeling machines, and more particularly to a peeler and grater disc and a peeling chamber wall configuration for use in such machines.

Commercial machines for peeling vegetables include constructions such as disclosed in U.S. Pat. No. 2,238,083, assigned to the assignee of the present invention. Such a machine includes a hopper into which the vegetables are placed and an abrasive disc which is rotated at the base of the vegetable peeling chamber to abrade the skins from the vegetables.

Machines have also been designed to which knives are employed to cut the skins from the vegetables. Generally the knives are individually attached to a rotating assembly, making the costs of such systems quite high.

SUMMARY OF THE INVENTION

Briefly, this invention includes a peeler and grater disc for a vegetable peeling machine, the disc having a plurality of individual cutting and peeling knives thereon. The knives are formed from the disc itself and are thus integral therewith. No separate attachment is required.

The invention also includes a series of ribs on the interior wall of the vegetable peeling chamber of the peeling machine. The ribs slope generally upwardly in the direction of rotation of the disc, to move the vegetables upwardly along the walls for better vegetable circulation within the vegetable peeling chamber.

In order to prevent excessive wear of the disc knife edges, each knive is provided with an upturned reinforcing lip adjacent the cutting edge of the knife. The reinforcing lip is also formed from the disc itself, and the upper edge of the lip cooperates with the cutting edge of the knife to define the knife cutting depth for removing the vegetable skins.

The portions of the disc from which the knives and reinforcing lips are formed serve as slots which pass through the disc.

In order to enhance uniformity of the vegetable peeling action, circulation and rotation of the vegetables are also promoted and maintained by arranging the individual knives on the disc in a plurality of generally spiral rows. Also, a pair of disc ribs is located radially on the surface of the disc to rotate the vegetables and to move them vertically with regard to the disc surface. The ribs are large in relation to the size of the vegetables and have generally sloped leading and trailing edges to avoid damaging the vegetables.

It is therefore an object of this invention to provide an improved peeler and grater apparatus which is inexpensive to fabricate; which includes liner ribs disposed at an angle to the horizontal; which includes a disc having inexpensive knife means formed thereon for peeling vegetables; a disc in which the knife means are formed from the material of the disc itself; in which no separate attachment means is required for each knife; which has lip means to reinforce the knives and increase the longevity thereof; in which the knives are arranged in generally spiral rows to promote uniform exposure of all sides of the vegetables to the knives on the disc surface; which has ribs located on the disc to promote uniform circulation of the vegetables within the vegetable peeling machine; and to accomplish all of the above objects and purposes in an inexpensive, highly durable, efficient and effective configuration readily applicable to a wide variety of vegetable peeling and grating applications.

Other objects and advantages of the invention will be apparent from the following description, the accompanying drawings and the appended claims.

BRIEF DESCRIPTION OF THE DRAWINGS

FIG. 1 is a partial sectional view of a vegetable peeling machine incorporating the wall ribs and the peeler and grater disc of this invention;

FIG. 2 is a diagrammatic top view of the disc of FIG. 1 showing the locations of the blades and ribs thereon;

FIG. 3 is an enlarged, somewhat diagrammatic fragment similar to FIG. 2;

FIG. 4 is a cross sectional view of the disc of this invention taken generally on line 4—4 of FIG. 3;

FIG. 5 is a cross sectional view taken generally on line 5—5 of FIG. 3;

FIG. 6 is a view of the disc and of one of the ribs thereon taken generally from line 6—6 of FIG. 7;

FIG. 7 is a cross sectional view of the disc taken generally on line 7—7 of FIG. 2; and FIG. 8 is a cross sectional view of the liner ribs taken generally on line 8—8 of FIG. 1.

DESCRIPTION OF THE PREFERRED EMBODIMENT

With reference to the drawings and more particularly to FIG. 1, there is illustrated a vegetable peeling machine 10. Machine 10 includes a hopper 11, a vegetable peeling chamber 43; and a drive shaft 12 passing through the base of the peeling chamber 43. Drive shaft 12 is connected to a drive means 14 for actuating the vegetable peeling machine 10.

A peeling chamber wall liner 15 is attached to the interior walls of peeling chamber 43 by any suitable means, such as screws 16, and includes a series of primary liner ribs 18 (FIGS. 1 and 8) which are inclined at an angle to the horizontal. The ribs 18 slope upwardly in the direction of rotation of the drive shaft 12, so that vegetables moved against the ribs 18 will be moved upwardly along the walls of the liners. By this means the vegetables are encouraged to circulate within the vegetable peeling chamber, resulting in more uniform processing and peeling of the vegetables.

Liner 15 is also provided with reinforcing ribs 19 to strengthen the liner against the considerable forces to which it is subjected during operation of the vegetable peeling machine. Of course the primary ribs 18 may also be formed as an integral part of the vegetable peeling chamber 43 walls, in which case the separate liner 15 and reinforcing ribs 19 may be omitted.

The peeler and grater disc 20 of this invention is attached to shaft 12 inside peeling chamber 43 adjacent the base thereof. When drive means 14 is actuated it rotates drive shaft 12 which in turn rotates disc 20 to cause the upper surface 22 thereof to abrade the skins from the vegetables.

The skins are abraded from the vegetables by means of knives 25 which cut thin slices of the skins away from the vegetables. The knives are formed from disc 20 itself and are therefore integral with it, making it very easy and inexpensive to fabricate the knives 25. Also, since they are formed from the same material as the disc 20 itself, and remain attached thereto, there is no need separately to attach the knives to the disc 20.

The slots 27 which remain in disc 20 after the knives 25 are formed serve to define knife slots on the upper surface 22 of the disc 20. The slots pass the vegetable peels and debris to the underside of disc 20 where arm 28, attached to disc 20, agitates the debris to help pass it out through drain 29.

In order to increase the service life of the vegetable peeler and grater disc 20 and to prevent excessive wear, each knife is provided with an upturned reinforcing lip 30. Each lip 30 is also formed from the material of disc 20, and is integral therewith. The lips 30 are turned up from surface 22 generally as the knives 25, and are substantially adjacent their respective knives 25 and slots 27.

The upper edge 32 of each lip 30 does not rise quite as high above surface 22 as the edge 35 of the corresponding knife 25. Edges 32 and 35 thus cooperate to define the cutting depth $a$ of each of the knives 25. That is, edges 32 limit the exposures of the vegetables to the knife edges 35.

The reinforcing lips 30 increase the service life of this invention and also enhance the durability thereof by allowing each knife to be elevated substantially above the surface 22 of disc 20 without undue exposure. Without lips 30 the knife edges 35 would quickly become flush. However, as each lip 30 and knife 25 wear, the increased height made possible by the incorporation of lips 30 provides more extended service life than would result with knives closer to the disc surface.

The knives 25 and lips 30 are arranged on disc 20 in generally spiral rows. This arrangement causes the vegetable to roll and rotate relative to the disc as it moves therepast. This in turn promotes uniform exposure of all sides of the vegetables to the disc surface 22 and to the knives 25. The formation of large flat surfaces on non-rotated vegetables is thus avoided.

A pair of disc ribs 40 is located on surface 22. The ribs include sloped leading and trailing surfaces 42 which engage the vegetables adjacent surface 22 and move them vertically to cause all the vegetables within the vegetable peeling chamber to circulate. Uniform exposure of all the vegetables to the disc 20 is thus assured.

As may be seen, therefore, this invention has numerous advantages. The knives are formed from the material of the disc itself and are integral therewith, resulting in great economies of production and vastly simplifying the problems of attaching the knives to the disc.

The knives themselves are assured for long life and service due to the incorporation of the reinforcing lips 30. The cutting depth $a$ of the disc 20 may easily be adjusted by the relative orientation of the edges 32 and 35, enabling the use of a number of discs appropriate to various vegetables and various seasons. For example, older potatoes have harder skins than newer ones, so a disc having a slightly deeper cutting depth $a$ would be used when older potatoes were being peeled.

The sloped leading and trailing surfaces 42 on the ribs 40 enable the ribs to engage the vegetables without damage thereto. The disc ribs 40 and the liner ribs 18 cooperate with the generally spiral configuration of the knife rows to assure uniform exposure of all sides of all the vegetables to the disc. That is to say, the vegetables are caused both to rotate and to circulate within the entire vegetable peeling chamber 43, so that the peeling is even and no large flat surfaces are formed on any of the vegetables.

While the form of apparatus herein described constitutes a preferred embodiment of this invention, it is to be understood that the invention is not limited to this precise form of apparatus, and that changes may be made therein without departing from the scope of the invention.

I claim:
1. A peeler and grater disc for a vegetable peeling machine comprising:
 a. a rotatable disc,
 b. knife means formed from the surface of said disc and integral therewith, said knife means having at least one knife edge for cutting thin slices from the surfaces of vegetables moved thereagainst during rotation of said disc, and
 c. lip means adjacent and slightly below the cutting edge of said knife means and formed from said disc and integral therewith to shield the knife means and limit the exposure thereof, to prevent excessive wear thereof, and to define the cutting depth of the knife means as the vegetables are moved thereagainst.

2. The disc of claim 1 wherein said knife means includes a plurality of individual knives formed from portions of said disc and integral therewith, said knives being arranged in generally spiral rows from the center of said disc to cause the vegetables moved thereagainst to rotate to promote uniform exposure of all sides of the vegetables to the disc surface and to avoid the formation of large flat surfaces on the vegetables.

3. A peeler and grater disc for a vegetable peeling machine comprising:
 a. a rotatable disc,
 b. a plurality of individual knives on said disc, said knives having cutting edges and being formed from portions of said disc and integral therewith, said knives being arranged in generally spiral rows from the center of said disc to cause the vegetables moved thereagainst to rotate to promote uniform exposure of all sides of the vegetables to the disc surface and to avoid the formation of large flat surfaces on the vegetables,
 c. the disc including slots therethrough adjacent said knives, and
 d. an upturned reinforcing lip adjacent the cutting edge of each said knife, each said reinforcing lip being formed from and elevated above the surface of said disc, the upper edge of each said lip cooperating with and being slightly lower than the respective said knife edge thereadjacent to reinforce each knife edge and limit the exposure thereof, to prevent excess wear of said knife edges, and to define the cutting depth of the knives as the vegetables are moved thereagainst.

4. A peeler and grater disc for a vegetable peeling machine comprising:
 a. a rotatable disc,
 b. knife means formed from the surface of said disc and integral therewith, said knife means having at least one knife edge for cutting thin slices from the surfaces of vegetables moved thereagainst during rotation of said disc, and
 c. an upturned reinforcing lip elevated above the surface of said disc adjacent the cutting edge of said knife means and formed from said disc and integral therewith, the upper edge of said lip cooperating with and being slightly lower than said adjacent knife edge to reinforce the knife means and limit the exposure thereof, to prevent excessive wear thereof, and to define the cutting depth of the knife means as the vegetables are moved thereagainst.

* * * * *